Jan. 22, 1929.
W. B. BRONANDER
1,699,653
MOTOR REDUCTION GEARING
Filed July 19, 1926
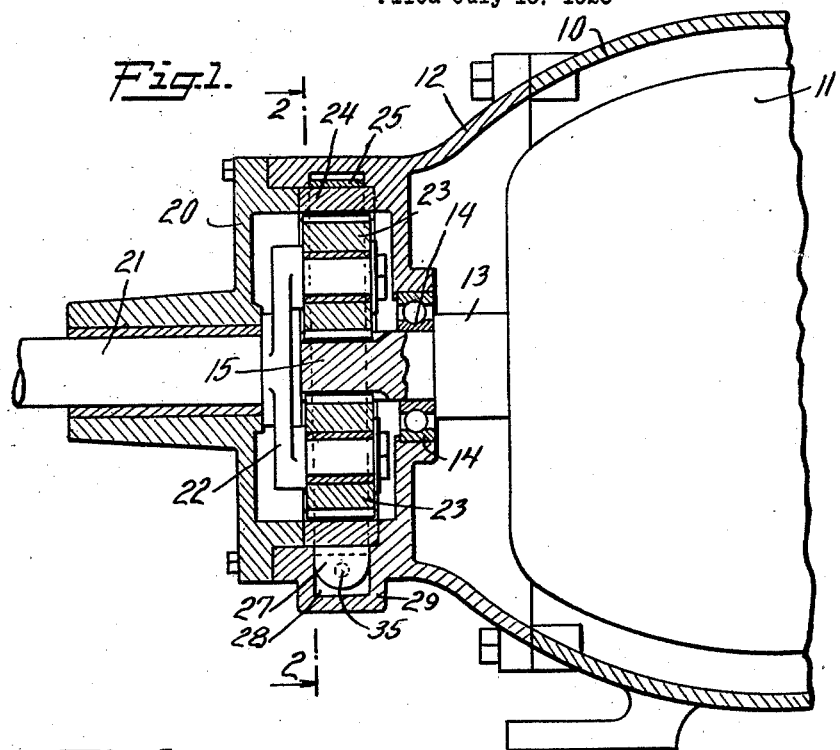
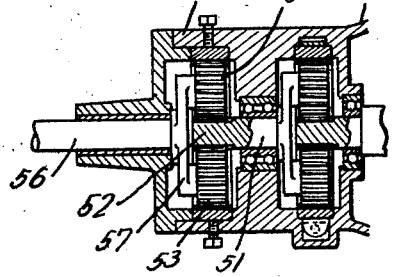
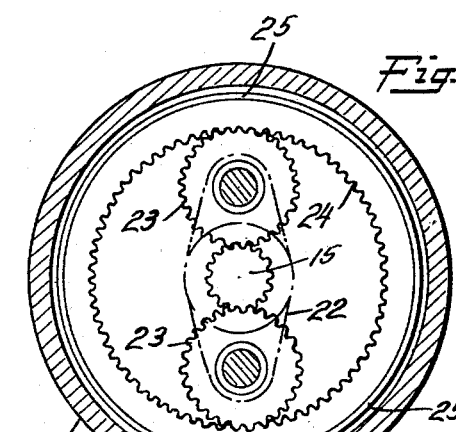
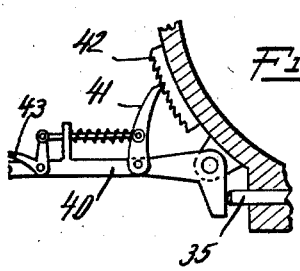
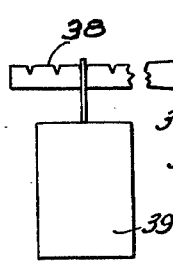
INVENTOR
Wilhelm B. Bronander
BY
Marshall & Hawley.
ATTORNEYS Patented Jan. 22, 1929.

1,699,653

UNITED STATES PATENT OFFICE.

WILHELM B. BRONANDER, OF MONTCLAIR, NEW JERSEY.

MOTOR-REDUCTION GEARING.

Application filed July 19, 1926. Serial No. 123,418.

This invention relates to reduction gearing and more particularly to reduction gearing for motors.

The invention has for its salient object to provide a reduction gearing that is simple and compact and can be mounted in the motor casing or casing cover.

Another object of the invention is to provide a reduction gearing so constructed that the gearing fulfills the function of a clutch and eliminates the necessity for a separate clutch.

Another object of the invention is to provide a reduction gearing so constructed and arranged that a double reduction can be obtained if desired.

Further objects of the invention will appear from the following specification taken in connection with the drawings, which form a part of this application, and in which Fig. 1 is a sectional elevation of a portion of a motor casing showing the reduction gearing mounted therein;

Fig. 2 is a sectional elevation taken substantially on line 2—2 of Fig. 1;

Fig. 3 is a sectional elevation similar to Fig. 1, but showing a double reduction gearing; and Fig. 4 shows a manually operable adjusting lever for the brake band that controls the reduction gearing.

The invention briefly described consists of a reduction gearing adapted particularly for motors such as electric motors and so constructed that it can be mounted in the cover of the motor casing surrounding the armature shaft. In the form of the invention illustrated, planetary gearing is secured in the casing cover, the pinion being formed on or driven by the motor shaft and the planet gears being connected to the driven shaft. A ring gear surrounds the planet gears and a brake is provided for holding the ring gear against rotation. The ring gear and brake serve the function of a clutch and when the ring gear is held against rotation, the driven shaft will be rotated at a speed much lower than the speed of the motor shaft. If desired, the driven shaft can be provided with a pinion which meshes with another set of planet gears which in turn mesh with a ring gear. The ring gear is held against rotation or is fixed. Further details of the invention will appear from the following description.

In the embodiment of the invention illustrated in Figs. 1 and 2, there is shown a motor casing 10 for an electric motor 11, a casing end or cover 12 being secured to one end of the motor casing. The armature shaft 13 is mounted in bearings 14 carried by the cover 12 and has formed on or secured to its outer end a pinion 15. An end plate 20 is secured to the outer end of the casing end or cover 12 and has journaled therein a driven shaft 21. The shaft 21 is connected to a spider 22 which carries planet gears 23 disposed in mesh with the pinion 15. A ring gear 24 surrounds and meshes with the planet gears and a brake band 25 encircles the ring gear 24.

The brake band 25 as shown in Fig. 2 has laterally extending ends 26 and 27 disposed in a recess 28 formed in an extension 29 of the cover 12. The extension 26 is engaged by a pin 30 adjustably mounted in the extension 29 and locked in adjusted position by a lock nut 31. A spring 32 is mounted between the extensions 26 and 27 and the extension 27 is engaged by a slidable pin 35 which is engaged by one end 36 of a bell crank lever pivoted at 37 to the cover 12. The other end 38 of the bell crank lever has adjustably mounted thereon a weight 39.

When the bell crank lever is in the position shown in Fig. 2, the pin 35 is pushed inwardly, thus causing the brake band to grip the ring gear 24. The weight 39 can be adjusted to any position on the bell crank lever, thus providing a yielding grip for the brake band. It will be evident that by adjusting the weight 39, the amount of tension on the brake band can be regulated and in case of overload on the driven shaft 21, a slippage will be permitted between the armature shaft and the driven shaft.

If desired, the bell crank lever 40 may be manually adjusted as shown in Fig. 4. A pawl 41 and rack 42 hold the lever 40 in adjusted position to place any desired tension on the brake band 25. The pawl 41 can be released by a releasing lever 43.

From the foregoing description of the structure in Figs. 1 and 2, it will be evident that when the ring gear is gripped by the brake band, the shaft 21 will be driven in the same direction as and at a much slower speed than the shaft 13.

If desired, a double reduction drive can be obtained in the manner shown in Fig. 3. In this figure, it will be noted that the driven shaft 51 has formed thereon or connected thereto a pinion 52 which meshes with planetary gears 53 which in turn mesh with a ring gear 54 fixedly mounted in an extension 55 of the motor casing cover 12. A second driven shaft 56 is connected to the spider 57 which carries the planet gears 53. In this manner a double reduction is obtained.

From the foregoing specification it will be seen that a simple, practical and compact reduction gearing has been designed and that this gearing can be installed in any motor casing by removing the casing cover at one end of the casing and substituting therefor a casing cover having reduction gearing mounted therein.

Although certain specific embodiments of the invention have been particularly shown and described, it will be understood that the invention is capable of further modification and that further changes in the construction and in the arrangement of the various cooperating parts may be made without departing from the spirit or scope of the invention, as expressed in the following claims.

What I claim is:

1. In combination, a motor casing, a motor therein having an armature shaft, a casing cover secured to one end of the motor casing and surrounding the armature shaft, reduction gearing carried by said motor casing cover and connected to said armature shaft, said gearing including planet gears geared to said shaft, a rotatable ring gear, manually adjustable friction means for holding the ring gear against rotation, and a driven shaft carried by said casing cover and connected to said planet gears, said means comprising a brake band surrounding said ring gear, and having a lug thereon, a plunger slidably mounted in said cover for engagement with said lug, a bell crank mounted externally of said cover for engagement with said plunger and ratchet controlled means for determining the position of said bell crank.

2. In combination, a motor casing, a motor therein having an armature shaft, a casing cover secured to one end of the motor casing and surrounding the armature shaft, reduction gearing carried by said motor casing cover and connected to said armature shaft, said gearing including planet gears geared to said shaft, a rotatable ring gear, a brake band surrounding the ring gear and adjustable means for tightening said band, comprising a plunger slidably mounted in said cover to engage a lug on said band, a bell crank mounted externally of said cover for engagement with said plunger and ratchet controlled means for determining the position of said bell crank.

3. In combination, a motor casing, a motor therein having an armature shaft, a casing cover secured to one end of the motor casing and surrounding the armature shaft, reduction gearing carried by said motor casing cover and connected to said armature shaft, said gearing including planet gears geared to said shaft, a rotatable ring gear, a brake band surrounding said ring gear, and adjustable means for tightening said band, comprising a lug formed on said band, a plunger slidably mounted in said cover for engagement with said lug, a bell crank pivoted externally of said cover and having one arm thereof in engagement with said plunger, ratchet teeth mounted on said cover and a pawl pivoted to the other arm of said bell crank and a spring control for positioning said pawl with respect to said teeth, said pawl and teeth providing a control to determine the position of said bell crank and plunger.

In witness whereof, I have hereunto set my hand this 8th day of July, 1926.

WILHELM B. BRONANDER.